(12) United States Patent
Steele et al.

(10) Patent No.: US 8,557,911 B2
(45) Date of Patent: Oct. 15, 2013

(54) AQUEOUS COLLOIDAL DISPERSIONS STABILIZED WITH POLYMERIC DISPERSANTS

(75) Inventors: Margaret D. Steele, Webster, NY (US); James W. Blease, Avon, NY (US); Yongcai Wang, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 991 days.

(21) Appl. No.: 12/234,742

(22) Filed: Sep. 22, 2008

(65) Prior Publication Data

US 2009/0170989 A1    Jul. 2, 2009

Related U.S. Application Data

(60) Provisional application No. 61/016,968, filed on Dec. 27, 2007.

(51) Int. Cl.
| | | |
|---|---|---|
| C08K 5/22 | (2006.01) | |
| C08K 5/23 | (2006.01) | |
| C09B 67/20 | (2006.01) | |

(52) U.S. Cl.
USPC ............................ 524/500; 524/190; 524/501

(58) Field of Classification Search
USPC ................................................ 524/190, 522
See application file for complete search history.

(56) References Cited

U.S. PATENT DOCUMENTS

| 6,011,098 | A | * | 1/2000 | Kashiwazaki et al. ........ 524/377 |
|---|---|---|---|---|
| 6,874,881 | B2 | * | 4/2005 | Suzuki et al. ................. 347/100 |
| 2003/0225185 | A1 | | 12/2003 | Akers, Jr. et al. |
| 2005/0014864 | A1 | * | 1/2005 | Akers et al. .................... 523/161 |
| 2005/0124726 | A1 | | 6/2005 | Yatake et al. |
| 2006/0014855 | A1 | | 1/2006 | House et al. |
| 2006/0084720 | A1 | | 4/2006 | Tyvoll et al. |
| 2006/0155006 | A1 | | 7/2006 | Nakamura et al. |
| 2007/0100024 | A1 | | 5/2007 | Gu et al. |

FOREIGN PATENT DOCUMENTS

| EP | 1 357 157 | 10/2003 |
|---|---|---|
| EP | 1 541 644 | 6/2005 |
| EP | 1 666 547 | 6/2006 |

* cited by examiner

*Primary Examiner* — Ling Choi
*Assistant Examiner* — Darcy D Laclair Lynx
(74) *Attorney, Agent, or Firm* — Andrew J. Anderson

(57) ABSTRACT

A colloidal pigment dispersion composition comprising: water; dispersed pigment particles; a first polymer dispersant comprising units derived from an acrylate or methacrylate monomer having an alkyl group with 12 or more carbons and units derived from an ethylenicaly unsaturated monomer comprising a carboxylic acid substituent; and a second polymer dispersant comprising units derived from a monomer comprising an aromatic group containing substituent and units derived from an ethylenicaly unsaturated monomer comprising a carboxylic acid substituent, wherein the second polymer dispersant does not comprise units derived from an acrylate or methacrylate monomer having an alkyl group of 12 or more carbons, and wherein the second polymer dispersant has an acid number less than 270.

20 Claims, No Drawings

AQUEOUS COLLOIDAL DISPERSIONS STABILIZED WITH POLYMERIC DISPERSANTS

CROSS-REFERENCE TO RELATED APPLICATIONS

This is a 111A application of Provisional Application Ser. No. 61/016,968, filed Dec. 27, 2007.

FIELD OF THE INVENTION

The invention relates generally to the field of aqueous-based colloidal dispersions of water-insoluble materials using polymeric dispersants, and in particular to aqueous-based pigment dispersions using polymeric dispersants. More specifically, the invention relates to aqueous-based pigment dispersions for inkjet inks using polymeric dispersants.

BACKGROUND OF THE INVENTION

Colloidal dispersions of water-insoluble materials in aqueous-based carriers have found widespread use in a number of important applications including; paints, inks, agriculture, pharmaceutical, and construction chemicals, just to name a few. A colloidal dispersion is herein defined as a system in which finely divided particles, which are approximately 10 to 1,000 nanometers in size, are dispersed within a continuous liquid carrier in a manner that prevents them from being easily agglomerated or rapidly settled. In recent years, nano-particle systems, generally defined as particles having diameters less than about 100 nanometers, have become increasingly important. In many of these systems the preferred carrier for the particles is water or a mixture of water and water-miscible co-solvents. An important performance feature of all of these colloidal systems is their inherent particle stability over the useful life of the system.

A great deal of exploration has been conducted to design aqueous-based colloidal dispersions such as pigment-based inks that are stable against agglomeration and settling for long periods of time. "Colloidally stable" as used herein means that the desired particle size or distribution of sizes of the colloid is relatively unchanged with time or storage conditions. Colloidal instability can occur by a number of phenomena such as: ripening, coalescence, agglomeration, or flocculation. One preferred approach to colloidal stability has been the use of small molecule ionic or nonionic surfactants. However, these systems have limitations based on the complexity of the aqueous carrier and associated additives contained therein.

A second approach has been the use of polymeric dispersants. In general, polymeric dispersants have been designed to have portions of the dispersant that are hydrophobic and portions of the dispersant that are hydrophilic. Polymeric dispersants are generally defined as random, block, or graft polymers and can have a wide variety of conformations and chemical compositions that are tailored to the specific surface of the water-insoluble colloid and the make-up of the aqueous-based carrier fluid.

One commercially important class of water-insoluble colloids is pigments. Pigments can generally be defined as inorganic or organic. Examples of inorganic pigments include metal oxides such as titanium dioxide, silicon dioxide, and numerous others. Examples of organic pigments are those commonly used as colorants in the art of ink technology, for example, quinacridones, phthalocyanines, azos, carbon blacks, and numerous others. Many polymeric dispersant systems have been proposed to disperse pigments in aqueous-based carriers. However, the surfaces of pigments vary substantially and will sometimes have dramatically different affinity for a given polymeric dispersant. The use of water-miscible organic co-solvents in the water phase of the colloidal dispersion may also have a profound impact on the affinity of a polymeric dispersant for a surface of a pigment.

Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desktop document and photographic-quality imaging, to short run printing and industrial labeling.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment-based inks have a number of drawbacks. Great lengths must be undertaken to reduce a pigment to a sufficiently small particle size, and to provide sufficient colloidal stability to the particles.

One approach to dispersing a pigment in an aqueous carrier involves mechanical milling of a pigment in the presence of a polymeric dispersant. Examples of polymer dispersants for milling a pigment are described in U.S. Pat. Nos. 6,245,832; 5,085,698; and 4,597,794; and US Publication Numbers 2006/0014855; 2007/0043144; and 2007/0043146. More recent copolymer dispersant designs disclose the use of a hydrophobic portion combined with multiple types of hydrophilic portions, as disclosed in U.S. Publication No. 2006/0084720 and EP 1666547.

Although these polymeric dispersants are known as colloidal stabilizers for pigments in water, they can be insufficient stabilizers of the pigment surface in a mixture of water and organic co-solvents. This is especially true under accelerated keeping conditions such as temperatures in excess of 40 degrees Celsius. The presence of such organic co-solvents, as is the case in most modern inkjet ink applications, can have deleterious consequences that result in an increase in the population of large particles or agglomerates of particles in the colloidal suspension or ink. Specific examples of the negative consequences of particle growth include: plugging of a small diameter inkjet printhead nozzle, loss of gloss in a printed image, and sedimentation of the colloid during storage in an inkjet ink tank or cartridge.

A second approach to dispersing a pigment with a polymeric dispersant involves covalently bonding the polymer to the pigment surface, or encapsulating the pigment surface with a polymer. Numerous approaches to this method of pigment stability have been proposed including, U.S. Pat. Nos. 5,990,202; 6,635,693; 6,972,303; and US Publication No. 2006/0155006. However, these approaches involve carefully controlled polymerizations in the presence of a pigment or approaches that involve volatile solvents that must be removed at some stage in the process. The complexity and added processing steps of such approaches add undesirable costs to the manufacturing process of a colloidal suspension or ink.

There remains the need for a simple means to produce a colloidal dispersion of water-insoluble pigment particles in an aqueous-based carrier that results in a distribution of particles that is stable to changes in particle size with time, especially under harsh conditions of high temperature and/or organic co-solvent formulations. Additionally, there remains the need for a polymeric dispersant approach that works well with many different types or classes of pigments.

SUMMARY OF THE INVENTION

The present invention is directed to overcoming one or more of the problems set forth above. Briefly summarized, according to one aspect of the present invention, an aqueous colloidal pigment dispersion composition is provided that shows minimal growth in particle size under conditions of long term storage or elevated temperature keeping.

In accordance with one embodiment, the invention is directed towards a colloidal pigment dispersion composition comprising: water; dispersed pigment particles; a first polymer dispersant comprising units derived from an acrylate or methacrylate monomer having an alkyl group with 12 or more carbons and units derived from an ethylenicaly unsaturated monomer comprising a carboxylic acid substituent; and a second polymer dispersant comprising units derived from a monomer comprising an aromatic group containing substituent and units derived from an ethylenicaly unsaturated monomer comprising a carboxylic acid substituent, wherein the second polymer dispersant does not comprise units derived from an acrylate or methacrylate monomer having an alkyl group of 12 or more carbons, and wherein the second polymer dispersant has an acid number less than 270.

DETAILED DESCRIPTION OF THE INVENTION

The water-insoluble colloidal particles of the present invention are pigment particles dispersed with a plurality of polymeric dispersants in an aqueous-based carrier medium. In a specific embodiment, the colloidal pigment dispersion may be used as an ink, and in particular an ink for inkjet printing. Pigments suitable for use in the invention include, but are not limited to, azo pigments, monazo pigments, diazo pigments, β-Naphthal pigments, Naphthal AS pigments, benzimidazolone pigments, diazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

The present invention is particularly useful for monoazo pigments represented by the general Structure 1 due to their susceptibility to particle instability and growth in ink formulations.

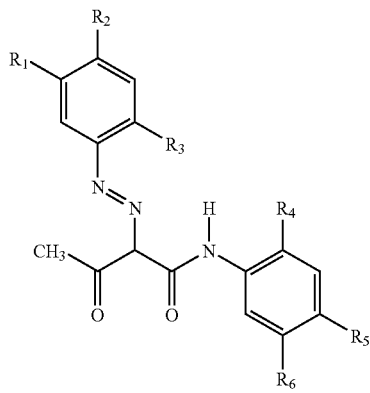

Structure 1

In the general Structure 1, $R_1$, $R_2$, $R_3$, $R_4$, $R_5$, and $R_6$ each independently represent a hydrogen atom, an alkyl group having 1 to 3 carbon atoms, a fluoroalkyl group having 1 to 3 carbon atoms, an alkoxyl group having 1 to 3 carbon atoms, a halogen atom, a nitro group, a sulfonic acid group or an alkaline earth metal salt thereof, an N-phenylaminosulfonyl group, a carboxyl group or an alkaline earth metal salt thereof, a carboamide group, an N-phenylcarbamoyl group, an ureylene group, an iminodicarbonyl group, or a carboxylate group. Specific examples of pigments that are represented by the general Structure 1 non-limitedly include C.I. Pigment Yellows: 1, 2, 3, 5, 6, 49, 65, 73, 74, 75, 97, 98, 111, 116, 130, 61, 62:1, 133, 168, 169, and so on. A pigment especially useful in the present invention is C.I. Pigment Yellow 74.

First Dispersant

The pigment particles of the present invention are stabilized with the use of a first dispersant wherein the first dispersant is an acrylic polymer as herein defined. The use of the term (meth)acrylate is herein defined to mean, interchangeably, methacrylate or acrylate. The first dispersant comprises units derived from an acrylate or methacrylate having an alkyl group of 12 or more carbon atoms, and units derived from at least one ethylenicaly unsaturated monomer comprising a carboxylic acid containing substituent.

Examples of specific acrylate or methacrylate units having an alkyl group of 12 or more carbon atoms useful in the present invention include the following: lauryl (meth)acrylate, tridecyl (meth)acrylate, tetradecyl (meth)acrylate, cetyl (meth)acrylate, iso-cetyl(meth)acrylate, stearyl (meth)acrylate, iso-stearyl(meth)acrylate, decyltetradecyl(meth)acrylate, and the like. Preferably the acrylic unit is stearyl methacrylate or stearyl acrylate.

Examples of ethylenicaly unsaturated monomers comprising carboxylic acid containing substituents useful in the present invention include the following: acrylic acid, methacrylic acid, itaconic acid, crotonic acid, fumaric acid, maleic acid, carboxymethyl(meth)acrylate, carboxyethyl(meth) acrylate, acryloxypropionic acid, methlacryloxyethyl succinate, and the like. Other useful carboxylic acid containing monomers may be a mixture of oligomeric acrylic acids expressed by the Structure 2:

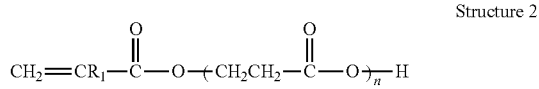

Structure 2 where, $R_1$ is H or methyl and n is between 1 and 6. Two or more carboxylic acid containing monomers may be used in combination in the first polymer dispersant.

Preferably, the first dispersant of the present invention comprises units in an amount of: at least about 5 weight percent, and more preferably at least 15%, acrylate or methacrylate units having 12 or more carbon atoms; at least about 15%, and more preferably at least 20% benzyl(meth)acrylate; and at least 20 weight percent and more preferably at least about 30% ethylenicaly unsaturated carboxylic acid containing substituent. Examples of preferred polymeric dispersants useful as the first polymeric dispersant also include those described in US Publication Numbers 2007/0043144 and 2007/0043146, the disclosures of which are incorporated herein by reference in their entirety.

Second Dispersant

The pigment particles of the present invention are stabilized with the use of a second dispersant, in addition to the first dispersant, wherein the second dispersant is a copolymer as herein defined. The second dispersant comprises at least hydrophobic units derived from a monomer comprising an aromatic group containing substituent (such as further described below), and units derived from at least one ethylenicaly unsaturated monomer comprising a carboxylic acid substituent (such as described above for the first dispersant), and optionally, additional monomer units that are not derived from an acrylate or methacrylate monomers having an alkyl group of 12 or more carbon atoms. The second dispersant has an acid number of less than 270, and more preferably less than or equal to 260, wherein, the acid number is defined as the number of milligrams of potassium hydroxide necessary to neutralize one gram of polymer. Thus, the acid number of a given polymer is related to the percent of acid-containing monomer or monomers. The higher the acid number, the more acid functionality is present in the polymer.

The hydrophobic units derived from a monomer comprising an aromatic group containing substituent may be a (meth) acrylate comprising an aromatic group, such as, benzyl(meth) acrylate. The hydrophobic unit comprising an aromatic group containing substituent may be a derivative of styrene including; styrene, divinylbenzene, methylstyrene, dimethylstyrene, ethylstyrene, isopropylstyrene, butylstyrene, hexylstyrene, cyclohexylstyrene, benzylstyrene, chloromethylstyrene, trifluoromethylstyrene, acetoxymethylstyrene, acetoxystyrene, vinylphenol, (t-butoxycarbonyloxy) styrene, methoxystyrene, 4-methoxy-3-methylstyrene, dimethoxystyrene, chlorostyrene, dichlorostyrene, trichlorostyrene, bromostyrene, iodostyrene, fluorostyrene, methyl vinylbenzoate ester, vinylbenzoic acid, etc.

The first and second polymeric dispersants may optionally include one or more additional units selected from; acrylic or methacrylic acids esters (such as, methyl(meth)acrylate, ethyl(meth)acrylate, butyl(meth)acrylate, hexyl (meth)acrylate, octyl(methacrylate), 2-hydroxyethyl(meth)acrylate, 2-acetoacetoxyethyl(meth)acrylate, sodium-2-sulfoethyl acrylate, 2-aminoethylmethacrylate hydrochloride, glycidyl methacrylate, and ethylene glycol dimethacrylate); vinyl ethers (such as, methyl vinyl ether, butyl vinyl ether, methoxyethyl vinyl ether, ethoxyethyl vinyl ether, chloroethyl vinyl ether, 1-methyl-2,2-dimethylpropyl vinyl ether, hydroxyethyl vinyl ether, diethylene glycol vinyl ether, dimethylaminoethyl vinyl ether, butylaminoethyl vinyl ether, benzyl vinyl ether, and tetrahydrofurfiuryl vinyl ether); vinyl esters (such as, vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, and vinyl acetoacetate); vinyl heterocyclic compounds (such as, N-vinyl oxazolidone, N-vinylimidazole, N-vinylpyrrolidone, N-vinylcarbazole, vinyl thiophene, and N-vinylethyl acetamide), olefins (e.g., dicyclopentadiene, ethylene, propylene, 1-butene, and 5,5-dimethyl-1-octene), halogenated olefins (e.g., vinyl chloride and vinylidene chloride); unsaturated nitriles (such as acrylonitrile); and acrylamides and methacrylamides (such as acrylamide, methacrylamide, N-methylacrylamide, N,N-dimethylacrylamide, N-isopropylacrylamide, N-s-butylacrylamide, N-t-butylacrylamide, N-cyclohexylacrylamide, N-(3-aminopropyl)methacrylamide hydrochloride, N-(3-dimethylaminopropyl)methacrylamide hydrochloride, N,N-dipropylacrylamide, N-(1,1-dimethyl-3-oxobutyl)acrylamide, N-(1,1,2-trimethylpropyl) acrylamide, N-(1,1,3,3-tetramethylbutyl)acrylamide, N-(1-phthalamidomethyl)acrylamide, sodium N-(1,1-dimethyl-2-sulfoethyl)acrylamide, N-butylacrylamide, N-(1,1-dimethyl-3-oxobutyl)acrylamide, N-(2-carboxyethyl)acrylamide, 3-acrylamido-3-methylbutanoic acid, and methylene bisacrylamide).

The first and second polymeric dispersants of the present invention are not limited in the arrangement of the repeating units comprising the polymers. The arrangement of monomers may be totally random, or they may be arranged in blocks such as AB or ABA wherein, A is the hydrophobic monomer and B is the hydrophilic (acid group containing) monomer. In addition, the polymer make take the form of a random terpolymer or an ABC triblock wherein, at least one of the A, B, and C blocks is chosen to be the hydrophilic monomer and the remaining blocks are hydrophobic blocks dissimilar from one another. Preferably the polymeric dispersants are random polymers.

The polymeric dispersants of this invention can be prepared by any emulsion polymerization, solution polymerization, or bulk polymerization technique well known in the art of polymer synthesis. Preferably, the polymeric dispersants of this invention have a weight average molecular weight of less than about 50,000 and more preferably less than about 20,000. Preferably, the polymeric dispersants of the present invention are water-soluble, wherein water soluble means that the polymers provide a visually clear solution when dissolved in water.

The carboxylic acid groups on the polymeric dispersants of the present invention are typically at least partially neutralized (converted into salts) using inorganic bases or organic bases. Typical organic bases include triethylamine, triethanolamine, N,N-dimethylethanolamine, and the like. Preferable inorganic bases include: potassium hydroxide, sodium hydroxide, rubidium hydroxide, ammonium hydroxide, or lithium hydroxide. Preferably, the polymers are neutralized with inorganic bases to improve firing performance from a thermal inkjet printhead. In a preferred embodiment, at least 50 percent of the available acid groups on the polymer are converted into salts using base, more preferably at least 70% and most preferably at least 85% of the available acid groups are converted. From a manufacturing perspective, preferably less than 100% of the acid groups are neutralized as this can lead to lack of control of the pH when the pigment particles are incorporated into an ink. Useful inks may have a preferred pH of from 5 to 10, more preferably from 6 to 8.

In a preferred embodiment, the colloidal pigment dispersions of the invention are used to prepare ink compositions suitable for inkjet printing. The pigment particles that are useful in the invention may be prepared by any method known in the art of inkjet printing. Useful methods commonly involve two steps: (a) a pigment dispersion or milling step to break up the pigments to a desired range of particle sizes; and (b) a dilution step in which the pigment dispersion from step (a) is diluted with the remaining ink components to give a working strength ink.

The pigment dispersion or milling step (a) is carried out using any type of grinding mill such as a media mill, ball mill, two-roll mill, three-roll mill, bead mill, and air-jet mill; an attritor; or a liquid interaction chamber. In the milling step (a), pigments are optionally suspended in a medium that is the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

At least one first dispersant (dispersant 1) is present in the milling step (a) in order to facilitate break up of the pigments particles. For the pigment dispersion obtained in step (a) or the ink composition obtained in step (b), at least one second dispersant (dispersant 2) is present in order to maintain particle stability and prevent settling. The amount of first and second dispersants used will depend on the amount of pigment particles, the pigment particle sizes and the make-up of the aqueous based carrier fluid. Typically, the first and second dispersants will preferably be present in a combined amount of at least about 20% by weight based on the weight of the pigment. The weight ratio of pigment to total polymeric dispersant preferably will be in the range from about 10:1 to about 1:2, and more preferably from about 5:1 to about 1:1. Useful ink compositions can comprise pigment particles from about 0.5% to about 10% by weight, more preferably from about 1% to about 6% and most preferably from about 1% to about 4%, and total dispersant amounts from about 0.1% to about 10% by weight, more preferably from about 0.5 to about 5% and most preferably from about 1 to about 4%, based on the total weight of the ink components.

The pigment particles of the colloidal dispersions and ink compositions of the present invention will typically have a distribution of particle diameters. The range of useful diameters of the pigment particles for ink compositions is from about 10 nanometers to about 1000 nanometers. Preferably, the particle diameter of the pigment particles will range from about 10 nanometers to about 500 nanometers and more preferably from about 10 nanometers to about 300 nanometers. Within the range of particles it is preferred that the majority of particles have diameters below about 100 nanometers. It is preferred that about 90% of the volume of the particles has a diameter below about 100 nanometers and more preferably below about 60 nanometers. It is desirable that the pigment particles of the present invention are dispersed as individual particles.

The carrier medium for the colloidal pigment dispersions and ink compositions of the invention comprises water. The carrier medium may further comprise one or more water-soluble humectants or co-solvents, in particular, so as to provide useful properties to an inkjet ink. "Water-soluble" is defined herein as a mixture of the employed humectant(s) or co-solvents and water is homogeneous. Typical useful properties include, but are not limited to: preventing the ink composition from drying out or crusting in the nozzles of the printhead; aiding solubility of the components in the ink composition; aiding firing properties of the ink from an ejector; facilitating penetration of the ink composition into the image-recording element after printing; aiding gloss; suppressing intercolor bleed; suppressing coalescence; and suppressing mechanical artifacts such as paper cockle and curl during and after printing. While an individual humectant or co-solvent can be employed, useful inkjet inks can employ mixtures of two, three, or more, each of which imparts a useful property to the inkjet ink.

Ink compositions useful in the invention preferably comprise a humectant in order to achieve high frequency firing with low variability. Representative examples of humectants which may be employed in the present invention include: (1) triols, such as; glycerol, 1,2,6-hexanetriol, 2-ethyl-2-hydroxymethyl-propane diol, trimethylolpropane, alkoxlated triols, alkoxylated pentaerythritols, saccharides, and sugar alcohols; (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexanediol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and (3) thioglycol, or a mixture thereof. Of these, glycerol and the polyhydric alcohol derivatives thereof are preferred and glycerol is especially preferred. The polyhydric alcohol derivatives of glycerol include the glycerol ethoxides, glycerol propoxides, and glyceryls. The useful humectants have melting points below the typical operating temperature of the intended printer system to avoid the formation of crystalline deposits on the printhead or in the maintenance system. Practically, this means that the useful humectants have melting points below 30° C., preferably below 20° C., and more preferably below 10° C. Typical aqueous-based ink compositions useful in the invention may contain 2-25 weight percent of such humectant(s), more preferably from about 6-20% humectant, most preferably from about 8-15% humectant.

The ink compositions of the present may also include, in addition to the above humectants, other water miscible co-solvents or penetrants. Representative examples of other co-solvents used in the aqueous-based ink compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols such as ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds such as urea, 2-pyrrolidinone, N-methyl-2-pyrrolidinone, and 1,3-dimethyl-2-imidazolidinone; and (4) sulfur-containing compounds such as 2,2'-thiodiethanol, dimethyl sulfoxide, and tetramethylene sulfone. Typical aqueous-based ink compositions useful in the invention may contain 2-10 weight percent of such other co-solvent(s).

In a particular embodiment, 1,2-alkane diols (e.g., 1,2-hexane diol and 1,2-pentane diol) and lower alkyl glycol ethers (eg. polyethyleneglycol monobutyl ether and diethyleneglycol monomethyl ether) may be employed as a humectant or co-solvents useful in the present invention. The present invention may be particularly advantageous when using such compounds, as the use of the combined dispersants of the present invention enable stable systems when using such compounds, while other surfactant-dispersed pigments or other polymeric-dispersed pigments known in the art can be destabilized by the high surface activity of the 1,2 alkane diols or alkyl glycol ethers.

Surfactants may be added to adjust the surface tension of the ink to an appropriate level. In a particular embodiment, relative dynamic and static surface tensions of various pigment based inks and colorless protective ink of an ink set may be controlled as described in copending, commonly assigned U.S. patent application Ser. No. 12/029,986 filed Feb. 12, 2006, the disclosure of which is incorporated by reference herein, to control intercolor bleed between the inks. In particular, where cyan, magenta, yellow, black, and colorless inks are employed, the surface tensions of the inks may have the relationships wherein: (i) the dynamic surface tension at 10 milliseconds surface age for all inks of the ink set is greater than or equal to 35 mN/m; (ii) the static surface tensions of the yellow ink and of the colorless protective ink are at least 2.0 mN/m lower than the static surface tensions of the cyan, magenta, and black inks of the ink set; and (iii) the static surface tension of the colorless protective ink is at least 1.0 mN/m lower than the static surface tension of the yellow ink.

The surfactants may be anionic, cationic, amphoteric, or nonionic and used at levels of 0.01 to 5% of the ink composition. Examples of suitable nonionic surfactants include, linear or secondary alcohol ethoxylates (such as the TERGITOL® 15-S and TERGITOL® TMN series available from Union Carbide and the BRIJ® series from Uniquema), ethoxylated alkyl phenols (such as the TRITON® series from Union Carbide), fluoro surfactants (such as the ZONYLS® from DuPont; and the FLUORADS® from 3M), fatty acid ethoxylates, fatty amide ethoxylates, ethoxylated and propoxylated block copolymers (such as the PLURONIC® and TETRONIC® series from BASF), ethoxylated and propoxylated silicone based surfactants (such as the SILWET® series from CK Witco), alkyl polyglycosides (such as the GLUCOPONS® from Cognis), and acetylenic polyethylene oxide surfactants (such as the Surfynols from Air Products).

Examples of anionic surfactants include carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX® series from Dexter Chemical), phosphonated and amine oxide surfactants, and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents" 1995, North American Editor."

The pigment based ink composition may optionally include additional additives that do not interfere with the colloidal stability of the pigment particles, but which are desirable for other ink properties. For example, a biocide (0.01-1.0% by weight) may also be added to prevent unwanted microbial growth which may occur in the ink over time. Preferred biocides include PROXEL® GXL (Zeneca Colours Co.) at a concentration of 0.05-0.1% by weight or KORDEK® (Rohm and Haas Co.) at a concentration of 0.05-0.1% by weight (based on 100% active ingredient). Additional additives which may optionally be present in an ink composition include thickeners, conductivity enhancing agents, anti-kogation agents, drying agents, waterfast agents, dye solubilizers, chelating agents, polymeric binders, light stabilizers, viscosifiers, buffering agents, anti-mold agents, anti-curl agents, stabilizers, and defoamers.

One particularly useful class of additives which can be present in inks of the present invention is durability enhancing polymer binders such as polyesters, polyamides, polyureas or polyurethanes. A particularly useful class of polymers are water dispersible polyurethanes as disclosed in US Publication Numbers 2006/0100308 and 2006/0100306, and co-pending unpublished U.S. Provisional Application No. 60/892,171 and 60/892,158, the disclosures of which are herein incorporated by reference in their entirety. "Water-dispersible" is herein defined as including individual polymer molecules or colloidal assemblies of polymer molecules which are stably dispersed in the ink without the need for a dispersing agent. Water dispersible polyurethanes particularly useful in the present invention may have the general Structure 3

Structure 3

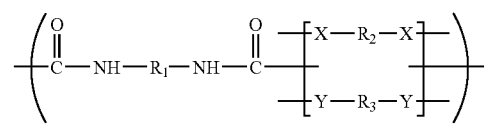

wherein $R_1$ in the structure (Structure 3) above is the central portion of the monomer unit that is the polymerization product of a diisocyanate; $R_2$ represents the central portion of a unit that is the polymerization product of at least one type of polyol or, optionally, a polyamine; $R_3$ is the central portion of a unit containing an acid group; and X and Y can be the same or different and are —O— or —N— atom.

$R_1$ of Structure 3 is preferably a hydrocarbon group having a valence of two, more preferably containing a substituted or unsubstituted alicyclic, aliphatic, or aromatic group, preferably represented by one or more of the following structures:

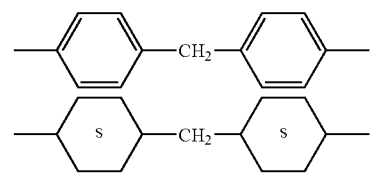

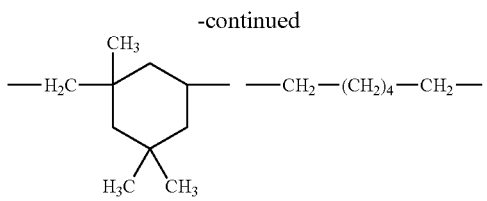

$R_2$ of Structure 3 preferably represents a soft segment comprising a prepolymer having ester, carbonate, or ether linkages.

The soft segment is introduced into the polyurethane backbone by using the prepolymer with both ends terminated with a hydroxyl(diol) or an amino(diamine) group. The prepolymer having terminal hydroxyl groups is known as polyols, and that having terminal amine groups is known as polyamine. Polyols useful for the practice of the invention include a) a polyester polyol obtained by, for example, esterification of a dicarboxylic acid with a diol; or ring opening reaction of a lactone (e.g. ε-caprolactone) and a diol; b) a polycarbonate polyol obtained, for example, by reacting a diols with diaryl carbonates or phosgene, and a polyether diol; and c) a polyether polyol as a condensation product of, for example, ethylene glycol, propylene glycol, or tetramethylene glycol. Preferably the polyols have a molecular weight above about 300 and below about 3000. Polyamines useful for the practice of the invention include those sold under the trade name JEFFAMFINE® D, ED, and M series from Huntsman. Another more preferred polyether diamine is a polytetrahydrofuran bis(3-aminopropyl) terminated having a molecular weight of about 1,000.

$R_3$ of Structure 3 is preferably the central portion of a monomeric unit containing a phosphoric acid, carboxylic acid, or sulfonic acid group, most preferably being carboxylic acids, such as 2,2'-bis(hydroxymethyl)propionic acid, 2,2'-bis(hydroxymethyl)butoric acid, hydroxyethylether of 4,4'-bis(4-hydroxyphenyl)valeric acid. These materials may be prepared by any of the well known techniques in art of polyurethane manufacture, for example, processes disclosed in U.S. Pat. No. 4,335,029 by Dadi et al., assignee Witco Chemical Corporation (New York, N.Y.) and in "Aqueous Polyurethane Dispersions" by B. K. Kim, Colloid & Polymer Science, Vol. 274, No. 7 (1996) 599-611 © Steinopff Verlag 1996.

Preferred polyurethanes employed in the invention have a sufficient amount of acid groups in the molecule to have an acid number from about 50 to about 150, more preferably from about 60 to about 140, and most preferably from about 65 to about 130, wherein, the acid number is defined as the milligrams of potassium hydroxide required to neutralize one gram of polymer. The acid number of the polymer may be calculated by the formula given in the following equation:

Acid number=(moles of acid monomer)*(56 grams/mole)*(1000)/(total grams of monomers)

where, moles of acid monomer is the total moles of all acid groups containing monomers that comprise the polymer, 56 is the formula weight for potassium hydroxide, and total grams of monomers is the summation of the weight of all the monomers, in grams, comprising the target polymer.

Polyurethane dispersions useful in the invention can be prepared by preparing a prepolymer having a relatively low molecular weight and a small excess of isocyanate groups and chain-extending with a chain extender the prepolymers into a high molecular weight polyurethane during the dispersion process. Such processes have been disclosed in, for example, U.S. Pat. No. 4,335,029 by Dadi et al., assigned to Witco Chemical Corporation (New York, N.Y.); in "Aqueous Polyurethane Dispersions" by B. K. Kim, Colloid & Polymer Science, Vol. 274, No. 7 (1996) 599-611 © Steinopff Verlag 1996; and in "Polyurethane Dispersion Process" by Mania et al., Paint and Coating Industry, January 2007, Page 30.

Preferred diamine chain extenders include ethylene diamine, diethylene triamine, propylene diamine, butylene diamine, hexamethylene diamine, cyclohexylene diamine, phenylene diamine, tolylene diamine, xylylene diamine, 3,3'-dinitrobenzidene, ethylene methylenebis(2-chloroaniline), 3,3'-dichloro-4,4'-biphenyl diamine. 2,6-diaminopyridine, 4,4'-diamino diphenylmethane, adducts of diethylene triamine with acrylate or its hydrolyzed products, hydrazine, and substituted hydrazines.

The polyurethane dispersions useful in the invention can also be prepared without involving the chain-extension step during the dispersion step. In the process the chemical reaction for forming urethane or urea linkages is completed prior to the dispersion step.

Polyurethanes useful in the invention preferably will have a minimum molecular weight of at least 8,000. Preferably, the polyurethane has a maximum molecular weight of 150,000. More preferably, the molecular weight of the polyurethane is between about 10,000 and 100,000, and most preferably between about 15,000 and 50,000. The polyurethane dispersions useful for the practice of this invention preferably have a mean particle size of less than 100 nm and more preferably less than 50 nm. As with the polymeric dispersants, the acid groups on the polyurethanes at least partially neutralized (converted into salts) using organic or inorganic bases, preferably monovalent inorganic bases, and most preferably aqueous alkaline metal hydroxides, selected from potassium hydroxide, sodium hydroxide, rubidium hydroxide, or lithium hydroxide.

When a water-dispersible polymer binder is employed in addition to the polymer dispersants, best results are obtained when the weight ratio of dispersed pigment to the sum of water soluble polymer dispersants and water dispersible polymer binder is between 4:1 and 1:3, more preferably between 3:1 and 1:2, and most preferably between 2:1 and 1:2. Lower quantities of polymer can cause poor jetting or poor film formation while higher quantities of polymer can cause poor jetting, clogging of ejectors or printer maintenance stations, and ink coalescence on many printing media.

The inks of the present invention can be printed through an inkjet printhead. Any of the known printhead designs in the art of inkjet printing may be used. Preferably, the inkjet printer is equipped with a thermal inkjet printhead. Particularly preferred printhead designs are disclosed in U.S. Pat. No. 7,350,902 and commonly assigned, copending, US Publication No. 2008/0136867, the disclosures of which are incorporated by reference herein.

Inks of the present invention may be applied to a photoglossy or plain paper receiver. The two types of receivers are distinguished from one another in that the photoglossy receiver is manufactured with a coated layer above the underlying paper support. Examples of plain papers include: Kodak bright white inkjet paper, Hewlett Packard Color inkjet paper, Xerox Extra Bright white inkjet paper, Georgia-Pacific inkjet Paper Catalog Number 999013, Staples inkjet paper International Paper Great White MultiUse 20 Paper, Xerox Premium Multipurpose Paper, Hammermill Copy plus or ForeMP paper, and Hewlett Packard Multipurpose paper. The plain papers may include papers that have been treated with multivalent salts during or after manufacture of the paper.

Inks of the present invention can be printed as digital images having photographic quality if a suitable recording medium, such as glossy inkjet paper, is used. Photoglossy receivers may be further categorized as being a swellable media (having a non-porous polymer coating) or a microporous media, although hybrid designs are also well known. The microporous media are typically comprised of water-absorbing fine particles or powders mixed with a polymeric hydrophilic binder to form a microporous structured coating. The hydrophilic particles or powders are typically polycrystalline inorganic materials such as boehmite alumina, porous and non-porous silicas (for example Sylojet or Ludox particles), or amorphous inorganic materials such as aluminum silicates. Microporous photoglossy media are preferred due to their relatively quick drying capabilities and improved water-fastness and smudge resistance compared to swellable media. The design of both the plain paper and photoglossy media vary widely depending on materials and paper manufacturing processes and should not be construed to limit the scope of the present invention.

The following examples illustrate, but do not limit, the utility of the present invention.

Examples of Polymeric Dispersants Used to Make Pigment Dispersions

Polymeric Dispersant PD-1

A copolymer of benzylmethacrylate, stearylmethacrylate, methacrylic acid, and carboxyethylacrylate oligomer (average Mw of 170 and n from 0 to 3 in Structure 2) was prepared, having an acid number of about 196, a weight ratio of monomers of 30/30/20/20, a weight average molecular weight of about 8330, and number average molecular weight of 3800 as determined by the Size Exclusion Chromatography. The polymer is neutralized with potassium hydroxide to have a degree of neutralization of about 90%.

Polymeric Dispersant PD-2:

A copolymer of benzylmethacrylate and methacrylic acid was prepared, having an acid number of about 135, a weight ratio of monomers of 77/23, a weight average molecular weight of about 7160, and number average molecular weight of 4320 as determined by the Size Exclusion Chromatography. The polymer is neutralized with potassium hydroxide to have a degree of neutralization of about 85%.

Polymeric Dispersant PD-3:

A copolymer of benzylmethacrylate and methacrylic acid was prepared, having an acid number of about 215, a weight ratio of monomers of 67/33, a weight average molecular weight of about 8000, and number average molecular weight of about 5000. The polymer is neutralized with potassium hydroxide to have a degree of neutralization of about 90%.

Polymeric Dispersant PD-4:

A copolymer of benzylmethacrylate, styrene, and methacrylic acid was prepared, having an acid number of about 195, a weight ratio of monomers of 20/50/30, a weight average molecular weight of about 13,400, and number average molecular weight of about 5050. The polymer is neutralized with potassium hydroxide to have a degree of neutralization of about 90%.

Polymeric Dispersant PD-5:

A copolymer of benzylmethacrylate, styrene, methacrylic acid, and carboxyethylacrylate oligomer (average Mw of 170 and n from 0 to 3) was prepared, having an acid number of about 164, a weight ratio of monomers of 12.5/50/12.5/25, a weight average molecular weight of about 14900, and number average molecular weight of 5060 as determined by the Size Exclusion Chromatography. The polymer is neutralized with potassium hydroxide to have a degree of neutralization of about 90%.

Polymeric Dispersant PD-6:

SMA17352®, a styrene maleic anhydride copolymer commercially available from SARTOMER COMPANY, INC. having an acid number of about 270. The polymer is neutralized with potassium hydroxide to have a degree of neutralization of about 85%.

Polymeric Dispersant PD-7:

TRUDOT® IJ-4655, a styrene acrylic copolymer commercially available from WESTVACO CORPORATION, having an acid number of about 230. The polymer is neutralized with potassium hydroxide to have a degree of neutralization of about 95%.

Polymeric Dispersant PD-8:

JONCRYL-678®, a styrene acrylic copolymer commercially available from BASF, having an acid number of about 215. The polymer is neutralized with potassium hydroxide to have a degree of neutralization of about 95%.

Polymeric Dispersant PD-9:

A copolymer of benzylmethacrylate, stearylmethacrylate, and methacrylic acid was prepared, having an acid number of about 215, a weight percent monomer ratio of 37/30/33, a weight average molecular weight of about 8230, and number average molecular weight of 4110 as determined by the Size Exclusion Chromatography. The polymer is neutralized with potassium hydroxide to have a degree of neutralization of about 90%.

Polymeric Dispersant PD-10:

A copolymer of styrene and methacrylic acid was prepared, having an acid number of about 163, a weight percent monomer ratio of 75/25, a weight average molecular weight of about 14000, and number average molecular weight of 4040 as determined by the Size Exclusion Chromatography. The polymer is neutralized with potassium hydroxide to have a degree of neutralization of about 90%.

Polymeric Dispersant PD-11:

A copolymer of benzylmethacrylate, stearylmethacrylate, methacrylic acid, and carboxyethyl acrylate was prepared, having an acid number of about 208, a weight percent monomer ratio of 30/30/20/20, a weight average molecular weight of about 10300, and number average molecular weight of 4480 as determined by the Size Exclusion Chromatography. The polymer is neutralized with potassium hydroxide to have a degree of neutralization of about 90%.

Polymeric Dispersant PD-12:

A copolymer of benzylmethacrylate and methacrylic acid was prepared, having an acid number of about 260, a weight percent monomer ratio of 60/40, a weight average molecular weight of about 8370, and number average molecular weight of about 4490. The polymer is neutralized with potassium hydroxide to have a degree of neutralization of about 90%.

Polymeric Dispersant PD-13:

A copolymer of benzylmethacrylate and methacrylic acid was prepared, having an acid number of about 325, a weight percent monomer ratio of 50/50, a weight average molecular weight of about 8660, and number average molecular weight of about 4640. The polymer is neutralized with potassium hydroxide to have a degree of neutralization of about 90%.

Examples of Polyurethane Binders Employed in Inks

Polyurethane Binder-PU-B1:

A 76 acid number polyurethane with a weight average molecular weight of 13,300 made with isophorone diisocyanate and a combination of poly(hexamethylene carbonate) diol and 2,2-bis(hydroxymethyl)propionic acid, where 100% of the acid groups are neutralized with potassium hydroxide.

Polyurethane Binder-PU-B2:

A 100 acid number polyurethane made with isophorone diisocyanate and a combination of 2000 Mw poly(tetrahydrofuran)diol and 2,2-bis(hydroxymethyl)propionic acid, where 85% of the acid groups are neutralized with potassium hydroxide.

Polyurethane Binder-PU-B3:

A 85 acid number polyurethane made with isophorone diisocyanate and a combination of 2000 Mw poly(tetrahydrofuran)diol and 2,2-bis(hydroxymethyl)propionic acid, where 85% of the acid groups are neutralized with potassium hydroxide.

Examples of Pigment Dispersions
Pigment Dispersion YD-1

A mixture of polymeric beads (milling media), CI Pigment Yellow 74 (Sun Chemical Corp.), and an aqueous solution of polymeric dispersant PD-1 was prepared and diluted with distilled water. The mixture was milled for 24 hours and the milling media was separated from the pigment dispersion. The resulting pigment dispersion was then filtered through a one-micrometer binder-free glass fiber filter (Pall Corp.) to obtain the final pigment dispersion having approximately 10% of pigment and 5% polymeric dispersant PD-1. The resulting dispersion of yellow pigment is designated as YD-1.

Pigment Dispersion YD-2

The procedure used to prepare YD-1 was used except that polymeric dispersants PD-1 and PD-4 were present during milling. The final pigment dispersion, YD-2, had approximately 10% of pigment, 4.5% polymeric dispersant PD-1, and 3.0% polymeric dispersant PD-4.

Pigment Dispersion YD-3

The procedure used to prepare YD-1 was used except that polymeric dispersants PD-1 and PD-10 were present during milling. The final pigment dispersion, YD-3, had approximately 10% of pigment, 4.5% polymeric dispersant PD-1, and 3.0% polymeric dispersant PD-10.

Pigment Dispersion YD-4

The procedure used to prepare YD-1 was used except that polymeric dispersants PD-11 and PD-2 were present during milling. The final pigment dispersion, YD-4, had approximately 10% of pigment, 5.0% polymeric dispersant PD-11, and 3.75% polymeric dispersant PD-2.

Pigment Dispersion YD-5

The procedure used to prepare YD-1 was used except that polymeric dispersants PD-1 and PD-2 were present during milling. The final pigment dispersion, YD-5, had approximately 10% of pigment, 5.0% polymeric dispersant PD-1, and 3.75% polymeric dispersant PD-2.

Preparation of Pigment Based Inks
Yellow Ink, Y1:

A yellow pigment based ink was prepared using YD-1 as the source of pigment particles such that the concentration of ingredients was as follows: 2.75% pigment yellow 74; 1.37% polymeric dispersant PD-1; 10% glycerol; 7% diethyleneglycol; 0.75% TERGITOLT® 15-S-5 (Dow Chemical Corp.); 0.02% KORDEK® (Rohm and Haas Co.); 1.2% PU-B1; 1.2% PD-2; and the balance deionized water.

Yellow Ink, Y2:

A yellow pigment based ink was prepared using YD-1 as the source of pigment particles such that the concentration of ingredients was as follows: 2.75% pigment yellow 74; 1.37% polymeric dispersant PD-1; 10% glycerol; 7% diethyleneglycol; 0.5% STRODEX® PK-90 (Dexter Chemical Corp.); 0.02% KORDEK® (Rohin and Haas Co.); 1.2% PU-B1; 1.2% PD-2; and the balance deionized water.

Yellow Inks, Y3-Y13:

A series of yellow inks were prepared according to Y2 except the second polymeric dispersant and/or polyurethane binder were varied according to table 1.

Yellow Ink, Y14:

A yellow pigment based ink was prepared using YD-1 as the source of pigment particles such that the concentration of ingredients was as follows: 2.75% pigment yellow 74; 1.37% polymeric dispersant PD-1; 10% glycerol; 7% diethyleneglycol; 3% 1,2-hexanediol; 0.5% STRODEX® PK-90 (Dexter Chemical Corp.); 0.02% KORDEK® (Rohn and Haas Co.); 1.0% PU-B1; 0.5% PD-2; and the balance deionized water.

Yellow Ink, Y15:

Prepared same as Y14, except PD-2 was not present.

Yellow Ink, Y16:

Prepared same as Y14, except 5% 1,2-pentanediol was used in place of 1,2-hexanediol, and the balance of water was adjusted.

Yellow Ink, Y17:

Prepared same as Y16, except 0.5% PD-2 was not present and the balance of water was adjusted.

Yellow Ink Y18:

A yellow pigment based ink was prepared using YD-2 as the source of pigment particles such that the concentration of ingredients was as follows: 2.75% pigment yellow 74; 1.37% polymeric dispersant PD-1; 1.37% polymeric dispersant PD-4; 10% glycerol; 2% ethyleneglycol; 0.5% STRODEX® PK-90 (Dexter Chemical Corp.); 0.02% KORDEK® (Rohm and Haas Co.); 1.2% PU-B1; and the balance deionized water.

Yellow Ink Y19:

A yellow pigment based ink was prepared same as Yellow ink Y18, except YD-3 was used in place of YD-2 as the source of pigment particles.

Yellow Ink Y20:

A yellow pigment based ink was prepared same as Yellow ink Y18, except YD-4 was used in place of YD-2 as the source of pigment particles.

Yellow Ink Y21:

A yellow pigment based ink was prepared same as Yellow ink Y18, except YD-5 was used in place of YD-2 as the source of pigment particles.

Yellow Ink Y22:

A yellow pigment based ink was prepared using YD-1 as the source of pigment particles such that the concentration of ingredients was as follows: 2.75% pigment yellow 74; 1.37% polymeric dispersant PD-1; 1.0% polymeric dispersant PD-11; 8% glycerol; 5% ethyleneglycol; 0.5% STRODEX® PK-90 (Dexter Chemical Corp.); 0.02% KORDEK® (Rohm and Haas Co.); 1.0% PU-B3; and the balance deionized water.

Yellow Ink Y23:

A yellow pigment based ink was prepared same as Yellow ink Y22, except PD12 was used in place of PD-11 as the second polymeric dispersant.

Yellow Ink Y24:

A yellow pigment based ink was prepared same as Yellow ink Y22, except PD-2 was used in place of PD-11 as the second polymeric dispersant.

TABLE 1

Formulation Summary for Yellows Inks Y1 through Y24

| Ink | Polymeric Dispersants | Polymeric Additive | Additional 1,2-Alkanediol |
|---|---|---|---|
| Y1 | PD-1, PD-2 | PU-B1 | none |
| Y2 | PD-1, PD-2 | PU-B1 | none |
| Y3 | PD-1, PD-2 | PU-B2 | none |
| Y4 | PD-1, PD-3 | PU-B1 | none |
| Y5 | PD-1, PD-4 | PU-B1 | none |
| Y6 | PD-1, PD-5 | PU-B1 | none |
| Y7 | PD-1, PD-6 | PU-B2 | none |

TABLE 1-continued

Formulation Summary for Yellows Inks Y1 through Y24

| Ink | Polymeric Dispersants | Polymeric Additive | Additional 1,2-Alkanediol |
|---|---|---|---|
| Y8 | PD-1, PD-7 | PU-B1 | none |
| Y9 | PD-1, PD-8 | PU-B1 | none |
| Y10 | PD-1, PD-9 | PU-B1 | none |
| Y11 | PD-1, PD-1 | PU-B1 | none |
| Y12 | PD-1, PD-1 | PU-B2 | none |
| Y13 | PD-1, PD-2 | PU-B1 | none |
| Y14 | PD-1, PD-2 | PU-B1 | 3% 1,2-hexanediol |
| Y15 | PD-1 | PU-B1 | 3% 1,2-hexanediol |
| Y16 | PD-1, PD-2 | PU-B1 | 5% 1,2-pentanediol |
| Y17 | PD-1 | PU-B1 | 5% 1,2-pentanediol |
| Y18 | PD-1, PD-4 | PU-B1 | none |
| Y19 | PD-1, PD-10 | PU-B1 | none |
| Y20 | PD-2, PD-11 | PU-B1 | none |
| Y21 | PD-1, PD-2 | PU-B1 | none |
| Y22 | PD-1, PD-12 | PU-B3 | none |
| Y23 | PD-1, PD-13 | PU-B3 | none |
| Y24 | PD-1, PD-2 | PU-B3 | none |

Yellow inks Y1 through Y24 were evaluated for particle size stability using a NANOTRAC® NAS 35 instrument from Microtrac Incorporated. Particle sizes are reported in nanometers (nm) as the diameters of the $50^{th}$ and $95^{th}$ percentiles in the intensity mode distribution. The $50^{th}$ percentile represents the median diameter of the intensity mode distribution. Unlike the volume and number distributions, the intensity mode distribution does not use Mie scattering theory and is more sensitive to the population of large diameter particles. Inks were evaluated shortly after preparation and the initial size data for the 50% and 95% percentiles were used as an indication of the initial state of colloidal stability. A sample of ink was then placed in a sealed plastic container and the inks were incubated for one week at a temperature of 60 degrees C. at which point the inks were evaluated again using the same intensity analysis methodology. Table 2 provides the results of the initial intensity particle size in nanometers, as well as the percent change in particle size after incubation. A larger value of the percent change indicates a more degraded state of colloidal stability. Inks showing a percent change in the $50^{th}$ percentile of less than about 25 are considered to be superior in colloidal stability. Conversely, inks showing a percent change in the $50^{th}$ percentile of greater than about 25 are considered to be inferior in colloidal stability and could contribute to degraded performance in thermal inkjet printhead.

TABLE 2

Intensity Mode Particle Size Data for Inks Y1 through Y17

| Ink | Initial $50^{th}$ Percentile size (nm) | Initial $95^{th}$ Percentile size (nm) | Percent change $50^{th}$ Percentile incubated | Percent change $95^{th}$ Percentile incubated |
|---|---|---|---|---|
| Y1 invention | 75 | 122 | 16 | 27 |
| Y2 invention | 73 | 122 | 14 | 57 |
| Y3 invention | 72 | 121 | 6 | 7 |
| Y4 invention | 72 | 122 | 9 | 25 |
| Y5 invention | 72 | 116 | 9 | 25 |
| Y6 invention | 72 | 125 | 14 | 18 |
| Y7 comp. | 75 | 136 | 33 | 46 |
| Y8 invention | 73 | 126 | 23 | 33 |
| Y9 invention | 72 | 111 | 19 | 68 |
| Y10 comp. | 73 | 122 | 33 | 74 |
| Y11 comp. | 73 | 120 | 32 | 57 |
| Y12 comp. | 75 | 131 | 44 | 91 |
| Y13 invention | 72 | 120 | 9 | 23 |
| Y14 invention | 70 | 117 | 17 | 24 |
| Y15 comp. | 71 | 114 | 45 | 82 |
| Y16 invention | 71 | 111 | 15 | 26 |
| Y17 comp. | 73 | 137 | 35 | 63 |
| Y18 invention | 74 | 142 | 13 | 5 |
| Y19 invention | 82 | 171 | 8 | 0 |
| Y20 invention | 74 | 216 | 16 | −11 |
| Y21 invention | 71 | 139 | 24 | 26 |
| Y22 invention | 76 | 202 | 19 | 9 |
| Y23 comp. | 77 | 184 | 58 | 49 |
| Y24 invention | 73 | 158 | 8 | 13 |

Table 2 shows that yellow pigment based inks formulated with a combination of polymeric dispersants can be prepared such that the initial particle size and state of colloidal stability is approximately equal before incubation. It is also shown that certain combinations of specific polymeric dispersants can have a substantial improvement in the long term colloidal stability of the pigment particles in the ink. Comparative inks Y7 and Y23 show that when the acid number of second polymer is greater than or equal to 270, pigment particle stability in the incubated ink is inferior. Inks Y10 through Y12 illustrate that when both the first and second polymeric dispersant comprises a long alkyl chain (meth)acrylate as a monomer unit, the colloidal stability of the pigment particles is inferior. Comparative inks Y15 and Y17 illustrate that when no second polymeric dispersant is present, the colloidal stability of the pigment particles is inferior.

Inventive inks Y1 through Y6, Y8, Y9, Y13, Y14, Y16, Y18 through Y22, and Y24 illustrate that a synergistic combination of polymeric dispersants, as defined herein, provide an improved colloidal stability of the pigment particles in the ink formulation, even in the presence of aggressive co-solvent humectants such as 1,2-hexanediol and 1,2-pentanediol and/or under conditions of high temperature storage.

Similar experiments were conducted using Pigment Red 122 and cyan pigment PB 15:3 as the source of pigments using combinations of PD-1 and PD-2 as the polymeric dispersants. Excellent colloidal stability was achieved in these systems with deviations in intensity mode UPA at the $50^{th}$ percentile of less than 25% from their original values after incubations of one week at 60 degrees C.

The invention has been described with reference to a preferred embodiment. However, it will be appreciated that variations and modifications can be affected by a person of ordinary skill in the art without departing from the scope of the invention.

The invention claimed is:

1. A colloidal pigment dispersion composition comprising:
water;
dispersed pigment particles;
a first polymer dispersant comprising units derived from an acrylate or methacrylate monomer having an alkyl group with 12 or more carbons and units derived from an ethylenicaly unsaturated monomer comprising a carboxylic acid substituent; and
a second polymer dispersant comprising units derived from a monomer comprising an aromatic group-containing substituent and units derived from an ethylenicaly unsaturated monomer comprising a carboxylic acid substituent, wherein the second polymer dispersant does not comprise units derived from an acrylate or methacrylate monomer having an alkyl group of 12 or more carbons, and wherein the second polymer dispersant has an acid number less than 270.

2. The composition of claim 1, wherein the first polymer dispersant further comprises units derived from benzyl methacrylate.

3. The composition of claim 1, wherein the first polymer dispersant comprises units derived from stearyl methacrylate or stearyl acrylate.

4. The composition of claim 1, wherein the first polymer dispersant comprises units derived from methacrylic acid.

5. The composition of claim 1, wherein the first polymer dispersant comprises units derived from at least one oligomeric acrylic acid expressed by the formula:

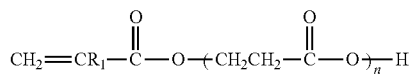

where, $R_1$ is H or methyl and n is between 1 and 6.

6. The composition of claim 5, wherein the first polymer dispersant further comprises units derived from methacrylic acid.

7. The composition of claim 5, wherein the first polymer dispersant comprises units derived from stearyl methacrylate or stearyl acrylate.

8. The composition of claim 1, wherein the pigment comprises a monoazo pigment represented by the general Structure 1:

Structure 1

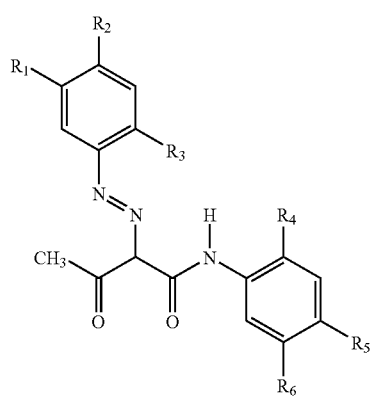

wherein $R_1$, $R_2$, $R_3$, $R_4$, $R_5$ and $R_6$ each independently represent a hydrogen atom, an alkyl group having 1 to 3 carbon atoms, a fluoroalkyl group having 1 to 3 carbon atoms, an alkoxyl group having 1 to 3 carbon atoms, a halogen atom, a nitro group, a sulfonic acid group or an alkaline earth metal salt thereof, an N-phenylaminosulfonyl group, a carboxyl group or an alkaline earth metal salt thereof, a carboamide group, an N-phenylcarbamoyl group, an ureylene group, and an iminodicarbonyl group or a carboxylate group.

9. The composition of claim 8, wherein the pigment is CI pigment yellow 74.

10. The composition of claim 1, wherein the composition is an inkjet ink and further comprises a humectant.

11. The composition of claim 10, wherein the pigment is CI pigment yellow 74.

12. The composition of claim 1, wherein the composition is an inkjet ink and further comprises a 1,2-alkanediol.

13. The composition of claim 12, where the 1,2-alkanediol is selected from 1,2-pentanediol and 1,2-hexanediol.

14. The composition of claim 13, wherein the pigment is CI pigment yellow 74.

15. The composition of claim 1, wherein the second polymer dispersant comprises units derived from benzyl methacrylate.

16. The composition of claim 15, wherein the second polymer dispersant additionally comprises units derived from methacrylic acid.

17. The composition of claim 1, wherein the second polymer dispersant additionally comprises units derived from styrene or alpha-methyl styrene.

18. The composition of claim 17, wherein the second polymer dispersant comprises units derived from methacrylic acid.

19. The composition of claim 1, wherein both the first polymer dispersant and the second polymer dispersant have a weight average molecular weight less than 20,000.

20. The composition of claim 1, further comprising a polymeric binder selected from: a polyurethane, polyurea, polyamide, or polyester.

* * * * *